(12) United States Patent
Takeuchi et al.

(10) Patent No.: US 10,530,203 B2
(45) Date of Patent: Jan. 7, 2020

(54) ROTOR AND RELUCTANCE MOTOR

(71) Applicants: Kabushiki Kaisha Toshiba, Minato-ku (JP); Toshiba Infrastructure Systems & Solutions Corporation, Kawasaki-shi (JP)

(72) Inventors: Katsutoku Takeuchi, Kokubunji (JP); Makoto Matsushita, Fuchu (JP); Norio Takahashi, Yokohama (JP); Daisuke Misu, Tama (JP); Toshio Hasebe, Hachioji (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/270,028

(22) Filed: Feb. 7, 2019

(65) Prior Publication Data
US 2019/0173336 A1    Jun. 6, 2019

Related U.S. Application Data

(63) Continuation of application No. PCT/JP2017/028948, filed on Aug. 9, 2017.

(30) Foreign Application Priority Data

Aug. 31, 2016 (JP) ................. 2016-170040

(51) Int. Cl.
*H02K 3/12* (2006.01)
*H02K 1/24* (2006.01)
(Continued)

(52) U.S. Cl.
CPC ........... *H02K 1/246* (2013.01); *H02K 19/103* (2013.01); *H02K 1/2773* (2013.01); *H02K 3/12* (2013.01); *H02K 2213/03* (2013.01)

(58) Field of Classification Search
CPC ...... H02K 1/246; H02K 1/276; H02K 1/2766; H02K 1/2773; H02K 2213/03; H02K 3/12; H02K 19/103
See application file for complete search history.

(56) References Cited

U.S. PATENT DOCUMENTS

2006/0113858 A1*  6/2006  Hino ...................... H02K 1/276
                                                           310/156.53
2014/0028139 A1*  1/2014  Hamer .............. B29C 45/14467
                                                           310/156.11
(Continued)

FOREIGN PATENT DOCUMENTS

EP          3 288 160 A1    2/2018
JP          2002-291288    10/2002
(Continued)

OTHER PUBLICATIONS

International Search Report dated Nov. 14, 2017 in PCT/JP2017/028948, filed on Aug. 9, 2017 (with English Translation).

*Primary Examiner* — Dang D Le
(74) *Attorney, Agent, or Firm* — Oblon, McClelland, Maier & Neustadt, L.L.P.

(57) ABSTRACT

According to one embodiment, a rotor includes a shaft and a rotor core fixed to the shaft. A plurality of flux barriers are formed at the rotor core. Each of the flux barriers is formed with a plurality of bridges, and one or more barrier regions that have a lower permeability than a portion other than each of the flux bathers in the rotor core between the plurality of bridges. A permanent magnet is provided in at least one of the barrier regions. A magnetizing direction of the permanent magnet is directed in a direction that intersects a longitudinal direction of the flux barrier. A value of $(\mu_0 \times S_M \times B_r)/(\mu_{re} \times t_{FB} \times w_B)$ is within a range between 1.2 and 3.0.

6 Claims, 11 Drawing Sheets

(51) Int. Cl.
*H02K 19/10* (2006.01)
*H02K 1/27* (2006.01)

(56) References Cited

U.S. PATENT DOCUMENTS

| 2014/0217859 A1* | 8/2014 | Saito | H02K 1/276 |
| | | | 310/68 D |
| 2016/0141926 A1* | 5/2016 | Kano | H02K 1/2766 |
| | | | 310/156.53 |

FOREIGN PATENT DOCUMENTS

| JP | 2011-83066 | 4/2011 |
| JP | 2012-178921 | 9/2012 |
| JP | 2012-178922 | 9/2012 |
| WO | WO 2016/171021 A1 | 10/2016 |

* cited by examiner

ROTOR AND RELUCTANCE MOTOR

CROSS-REFERENCE TO RELATED APPLICATIONS

This application is a continuation patent application of International Application No. PCT/JP2017/028948, filed Aug. 9, 2017, which claims priority to Japanese patent application No. 2016-170040, filed Aug. 31, 2016. Both applications are hereby expressly incorporated by reference herein in their entireties.

FIELD

Embodiments described herein relate generally to a rotor and a reluctance motor.

BACKGROUND

A technique in which permanent magnets are provided on a rotor of a reluctance motor and thereby saliency of the motor is improved is known.

However, in the related art, a magnetic flux leaked from permanent magnets provided on a rotor toward a stator, and an induced voltage was generated. As a result, an iron loss was generated during no-load rotation, and the energy efficiency of a system to which a reluctance motor was applied was sometimes reduced. Further, in the case where a short circuit occurred between terminals of a motor, such as a failure of a drive device during rotation, there was a problem in that a short-circuit current flowed.

The problem to be solved by the present invention is to provide a rotor and a reluctance motor capable of increasing a salient pole ratio without generating an induced voltage.

DETAILED DESCRIPTION

According to one embodiment, a rotor includes: a shaft configured to rotate about the central axis; and a rotor core fixed to the shaft. The rotor core has a plurality of flux barriers which are formed side by side in a radial direction of the rotor core and each of which ranges from a certain portion to another portion of an outer circumferential surface of the rotor core. Each of the flux barriers has a plurality of bridges that include a bridge forming a part of the outer circumferential surface of the rotor core at opposite ends thereof in a longitudinal direction thereof, and one or more barrier regions that have a lower permeability than a portion other than each of the flux barriers in the rotor core between the plurality of bridges. A permanent magnet is provided in at least one of the barrier regions. A magnetizing direction of the permanent magnet is directed in a direction that intersects a longitudinal direction of each of the flux barriers at a position at which the permanent magnet is provided. When a permeability of a region where the permanent magnet is not present in the barrier region is defined as $\mu_0$, a cross-sectional area of the permanent magnet in a plane that is orthogonal to an extending direction of the shaft is defined as $S_M$, a residual magnetic flux density of the permanent magnet is defined as $B_r$, a recoil permeability of the permanent magnet is defined as $\mu_{re}$, an arithmetic mean between a minimum and a maximum of a thickness of the barrier region is defined as $t_{FB}$, and the sum of widths of all the plurality of bridges is defined as $W_B$, a value of $(\mu_0 \times S_M \times B_r)/(\mu_{re} \times t_{FB} \times w_B)$ is within a range between 1.2 and 3.0.

Hereinafter, a rotor and a reluctance motor of an embodiment will be described with reference to the drawings.

Figure 1:
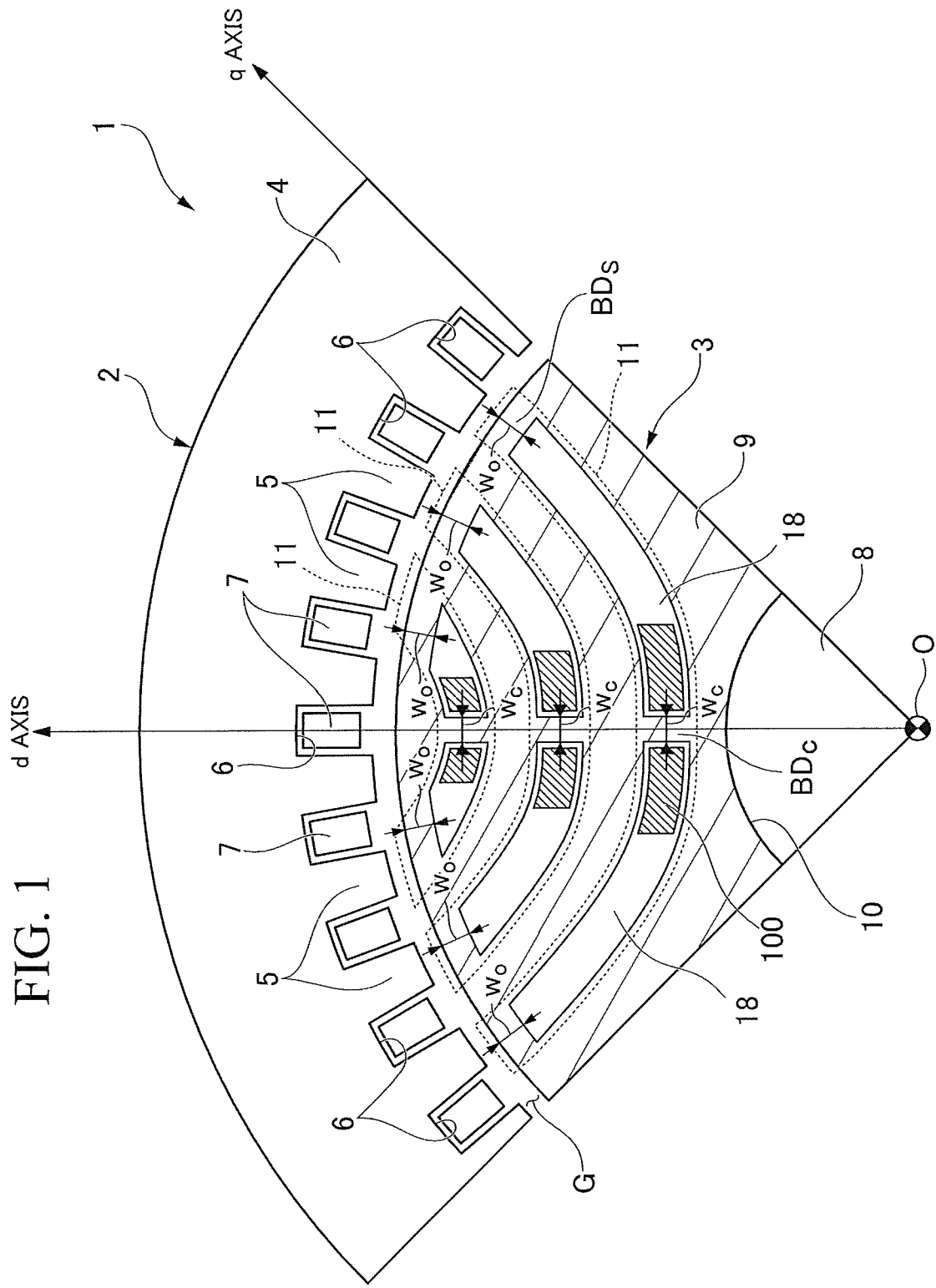
FIG. 1 is a sectional view that shows a constitution equivalent to one pole of a 4-pole reluctance motor in a first embodiment and that is orthogonal to a rotating shaft.

FIG. 1 is a sectional view that shows a constitution equivalent to one pole of a 4-pole reluctance motor 1 in a first embodiment and that is orthogonal to a rotating shaft 8. In FIG. 1, one pole of the reluctance motor 1, that is, only a circumferential angle region of a quarter of a circumference is showed. The rotating shaft 8 may be, for example, a shaft that is axially supported to be rotatable, extends in an axial direction centering on the rotating shaft 8, and is rotated about the rotating shaft 8.

As showed in FIG. 1, the reluctance motor 1 includes a stator 2 in an approximately cylindrical shape, and a rotor 3 that is provided inside the stator 2 in a radial direction and is provided to be rotatable relative to the stator 2. The stator 2 and the rotor 3 are disposed with central axes thereof located on a common axis. Hereinafter, the aforementioned common axis is referred to as a central axis O. A direction orthogonal to the central axis O is referred to as a radial direction, and a direction around the central axis O is referred to as a circumferential direction.

The stator 2 has a stator core 4 in an approximately cylindrical shape. The stator core 4 can be formed by stacking a plurality of electromagnetic steel sheets or by pressing a soft magnetic powder. A plurality of teeth 5, which protrude toward the central axis O and are disposed at regular intervals in the circumferential direction, are integrally formed on an inner circumferential surface of the stator core 4. The teeth 5 are formed in an approximately rectangular cross section. Respective slots 6 are formed between neighboring teeth 5. Armature windings 7 are wound around the teeth 5 via these slots 6.

The stator core 4 may have an insulator mounted with insulation properties, or be coated with an insulating film on an entire outer surface thereof (neither are shown). The armature windings 7 are wound around the teeth 5 with the insulator or the insulating film therebetween.

The rotor 3 includes the rotating shaft 8 that extends along the central axis O, and a rotor core 9 that is externally fitted to the rotating shaft 8 and has an approximately cylindrical shape. The rotor core 9 can be formed by stacking a plurality of electromagnetic steel sheets or pressing a soft magnetic powder. An outer diameter of the rotor core 9 is set such that a predetermined air gap G is formed between the teeth 5 that face each other in the radial direction.

Further, a through-hole 10 drilled along the central axis O is formed in the center of the rotor core 9 in the radial direction. The rotating shaft 8 is, for example, press-fitted into the through-hole 10. Thus, the rotating shaft 8 and the rotor core 9 are rotated together.

Furthermore, a plurality of flux barriers 11 (e.g., three flux barriers in the present embodiment) are formed side by side within one pole (i.e., in the circumferential angle region of the quarter of the circumference) in the rotor core 9 so as to pass through one diameter that crosses the rotating shaft 8 of the rotor core 9. That is, these flux barriers 11 are formed between a plurality of magnetic paths through which a magnetic flux produced by the stator 2 passes from a certain place to another place on an outer circumferential surface of the rotor core 9, and separate the magnetic paths. In the present embodiment, each of the flux barriers 11 has a plurality of barrier regions 18 (e.g., two barrier regions in the present embodiment), which are distributed in an approximately hyperbolic shape. In FIG. 1, a reference sign 18 indicates the barrier regions with respect to only the flux barrier 11 closest to the central axis O, and a reference sign 100 indicates the permanent magnets. However, this applies equally to the other flux barriers 11.

A direction in which a flow of magnetic flux is not obstructed by the barrier regions 18 in the rotor core 9 is defined as a q axis. That is, a positive magnetic potential (e.g., approaches the N pole of a magnet) is given to a certain circumferential angle position A of an outer circumferential surface of the rotor, whereas a negative magnetic potential (e.g., approaches the S pole of a magnet) is given to a circumferential angle position B shifted by one pole (90 degrees in the case of the present embodiment), so that a direction directed to the position A from the central axis O when most magnetic flux flows in a case where the position A is shifted in the circumferential direction is defined as a q axis. In the present embodiment, the q axis is set in longitudinal directions of the flux barriers 11 that separate the rotor core 9 into a region adjacent to the central axis O and a region distant from the central axis O.

On the other hand, a direction in which a flow of magnetic flux is obstructed by the barrier regions 18, that is, a direction that is magnetically orthogonal to the q axis is defined as a d axis. In the present embodiment, the d axis is set to a direction parallel to a direction in which two portions of the rotor core, which are separated into the regions adjacent to and distant from the central axis O by each flux barrier 11, face each other. Further, in a case where the flux barriers 11 are formed in multiple layers (three layers in the present embodiment), a direction in which the layers overlap one another is the d axis. The flux barriers 11 are not limited to three layers, and may be formed in one or two layers, or in four or more layers. The number of barrier regions 18 in each flux barrier 11 is not limited to two, and may be one or three or more.

Each of the barrier regions 18 is formed in the shape of an approximately circular-arc cross section that is curved in a convex shape from an outer circumferential side toward the central axis O on an inner side in the radial direction to follow the q axis on at least an outer circumferential side and so as for the middle in the circumferential direction to be located at an innermost side in the radial direction. The shape of each barrier region 18 is not limited to a circular arc, and may be a convex shape such as a U shape. In the present embodiment, six barrier regions 18 having an approximately circular-arc shape are formed in each of the circumferential angle regions of the rotor core 9.

In view of a centrifugal force occurring at the rotor core 9, the plurality of barrier regions 18 are provided at positions spaced apart from an outer circumference of the rotor core 9 by a predetermined distance $w_O$ at end portions 200b adjacent to an outer circumferential side of the flux barrier 11. Thus, the mechanical strength of the rotor core 9 located between an outer circumference of the rotor 3 and the end portions 200b of the barrier regions 18 can be raised. A plurality of bridges including outer circumferential bridges $BD_S$ are formed at the rotor core 9. The outer circumferential bridges $BD_S$ are bridges that constitute a part (the end portion 200b) of the outer circumferential surface of the rotor core 9 at opposite ends of the flux barrier 11 in longitudinal directions of the flux barrier 11. The outer circumferential bridges $BD_S$ function to couple (connect) the rotor core 9 to the rotor core 9 that is separated from the barrier regions 18 of each flux barrier 11. A width $w_O$ of each of the outer circumferential bridges $BD_S$ provided at the opposite ends of the flux barriers 11 is a width with respect to a direction directed from an outer circumferential side of the rotor 3 toward the rotating shaft 8.

Further, in a case where the plurality of barrier regions 18 are formed with a space in extending directions thereof at a midpoint between the opposite ends of each flux barrier 11 in an extending direction of each flux barrier 11 (e.g., at a portion closest to the rotating shaft 8 in the radial direction), the barrier regions 18 are formed at an interval spaced by a predetermined distance $w_C$. Thus, the mechanical strength of the rotor core 9 located between the plurality of barrier regions 18 can be raised. The predetermined distance $w_C$ may be identical to or different from the predetermined distance $w_O$. In the following description, the rotor core 9 located between the barrier regions 18 in the vicinity of a convex portion will be referred to as a "center bridge $BD_C$." The center bridge $BD_C$ is an example of an "inner bridge."

The paired barrier regions 18 between which the center bridge $BD_C$ is sandwiched have approximately the same shape as each other. As with the outer circumferential bridges $BD_S$, the center bridges $BD_C$ function to couple (connect) the rotor core 9 to the rotor core 9 that is separated from the barrier regions 18 of each flux barrier 11. Even in a state in which the flux barriers 11 are formed, the rotor core 9 is united as one member by the above bridges without the rotor core 9 being separated at the opposite ends and the midpoint of each of the flux barriers 11. The widths $w_O$ of the outer circumferential bridges $BD_S$ at the opposite ends of the plurality of flux barriers 11 formed in the radial direction may be different from each other, or may be partly or all the same as each other. Similarly, in a case where a plurality of center bridges $BD_C$ are formed, widths $w_O$ of the center bridges $BD_C$ of the plurality of flux barriers 11 formed in the radial direction may be different from each other, or may be partly or all the same as each other.

In the present embodiment, the permanent magnets 100 are inserted into the plurality of barrier regions 18, respectively. Each of the permanent magnets 100 in the present embodiment is a magnet rather than an electromagnet, and refers to an object that can continue to generate an almost constant magnetic field in a case where an age of service (a lifespan) of the reluctance motor 1 is considered. Each of the permanent magnets 100 is, for example, a neodyminum magnet, a ferrite magnet, a samarium iron cobalt magnet, or the like. The permanent magnets 100 inserted into the barrier regions 18 may be magnetized to undergo magnetization nearly in the direction of a d axis after being inserted, and the permanent magnets 100 magnetized in a predetermined direction in advance may be inserted such that magnetizing directions thereof are directed in a direction of an approximate d axis. That is, in the present embodiment, the magnetizing directions of the magnets are not limited to being magnetically completely orthogonal to the q axis, and may intersect the q axis with a certain degree of angular range from the orthogonal angle (e.g., at about 10 degrees). In other words, the magnetizing directions of the permanent magnets 100 are directed in directions that intersect the longitudinal directions of the flux barriers 11 at positions at which the permanent magnets are provided. To fix the inserted permanent magnets 100, each of the barrier regions 18 may be filled with a non-magnetic material such as an adhesive resin, and a spacer or the like of the non-magnetic material may be inserted into each of the barrier regions 18 along with each of the permanent magnets 100. Further, sides of the permanent magnets 100 are in contact with the rotor core 9, and thus the permanent magnets 100 may be fixed. The non-magnetic material has a lower permeability than the rotor core 9.

Further, the permanent magnet 100 is disposed to be separated from some (preferably all) of surfaces by which an outline (a boundary) of the barrier region 18 is defined (200b, 201a, 202a, and 202b to be described below in FIG. 3) in a section including the q and d axes. That is, the permanent magnet 100 is disposed not to be in direct contact with the rotor core 9 within the barrier region 18. Due to this disposition, local irreversible demagnetization occurring at corners or the like of the permanent magnet 100 can be suppressed. Of course, the permanent magnet 100 may be in contact with some or all of the surfaces by which the outline is defined. As will be described below, regardless of whether or not the permanent magnet 100 is in contact with the side (the rotor core 9) of the barrier region 18, if cross-sectional areas of the permanent magnets 100 are the same, the magnetic effects which are chiefly expected in the present embodiment are the same.

Figure 2:
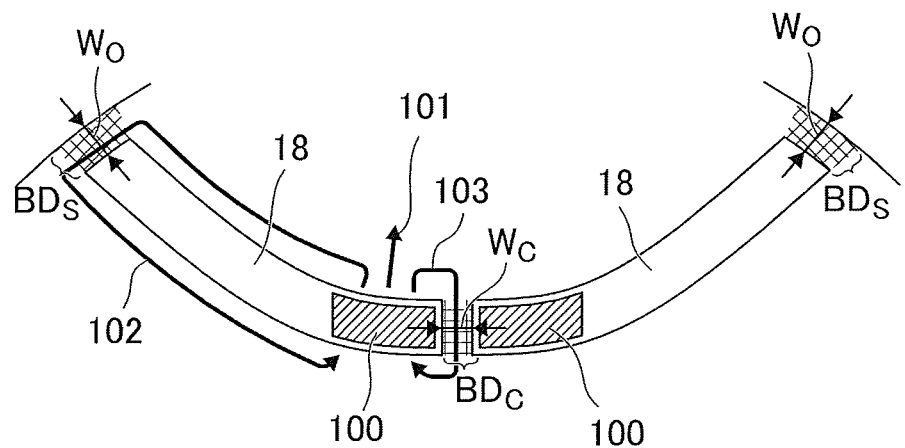
FIG. 2 is a schematic diagram showing a certain flux barrier and a rotor core adjacent thereto.

FIG. 2 is a schematic diagram showing a certain flux barrier 11 and a rotor core 9 adjacent thereto. As showed, for example, the permanent magnets 100 may be lopsidedly arranged close to the center bridge $BD_C$. Magnetic flux generated by a magnetomotive force of each of the permanent magnets 100 is divided into a magnetic flux 101 that is directed in a direction of an approximate d axis which is a magnetizing direction, a magnetic flux 102 that goes through the outer circumferential bridge $BD_S$, and a magnetic flux 103 that goes through the center bridge $BD_C$. Each of the outer circumferential bridge $BD_S$ and the center bridge $BD_C$ is a core, and thus has a saturated magnetic flux density according to a material thereof. Accordingly, when magnetic flux flows to each of the outer circumferential bridge $BD_S$ and the center bridge $BD_C$ beyond the saturated magnetic flux density of the core, a magnetic resistance of each of the bridges increases, so that it is difficult for the magnetic flux to flow thereto. In the present embodiment, since the magnetic flux generated from each of the permanent magnets 100 flows through each of the bridges in a direction that is substantially opposite to the direction of the direction of the d axis, hardly any of the magnetic flux flowing in from the vicinity of the stator 2 flows in a direction that is approximately opposite to the direction of the direction of the d axis at each of the bridges. Each of the bridges where magnetic flux is saturated allows no further magnetic flux to flow through, and thus serves as a flux barrier 11 in a broad sense. Due to the effects of the permanent magnets 100, the quantity of the magnetic flux that flows in the direction that is substantially opposite to the direction of the d axis in the quantity of a magnetic flux flowing in from the stator 2 is reduced, so that the quantity of a magnetic flux flowing in the direction of the q axis can be increased. Thus, saliency can be improved, compared to the reluctance motor 1 in which no permanent magnets 100 are provided in the barrier regions 18.

In a case where the reluctance motor 1 of the present embodiment is applied to either motors for high-speed rotation or large motors whose diameters are large, the rotor core 9 easily receives a large centrifugal force. In this case, there is a need to raise the mechanical strength by increasing the widths $w_O$ of the outer circumferential bridges $BD_S$ and the widths we of the center bridges $BD_A$. In this case, since the quantity of saturated magnetic flux (a product of the saturated magnetic flux density and the width of each of the bridges) at each of the bridges is increased, the permanent magnet 100 having a stronger magnetomotive force and a large quantity of magnetic flux (i.e., a high residual magnetic flux density and a large cross-sectional area) needs to be inserted into the barrier region 18. However, when the magnetomotive force and the quantity of magnetic flux of the permanent magnet 100 are excessively large, the magnetic flux 101, which is generated from the permanent magnet 100 and is directed in the direction of the d axis, is linked to the armature winding 7 via the air gap G. When the rotor 3 is rotated in this state, an induced voltage occurs. In this way, the relationship between the width of each of the bridges and the magnetomotive force of the permanent magnet 100 and the relationship between the width of each of the bridges and the quantity of magnetic flux of the permanent magnet 100 have a reciprocal relationship to each other, and there are numerical ranges of a suitable magnetomotive force and a suitable quantity of magnetic flux (i.e., a residual magnetic flux density and a cross-sectional area) under a constraint condition that an induced voltage is not generated. The numerical ranges will be described with reference to the drawings.

To suppress the occurrence of an induced voltage, the size of the permanent magnet 100 is determined according to a conditional expression represented by Equation (1) below.

[Equation 1]

$$S_M = \frac{\mu_{re}}{\mu_0} \frac{B_s}{B_r} w_B l_{FB} \quad (1)$$

In Equation (1), $S_M$ indicates a gross cross-sectional area of the permanent magnets 100 inserted into the barrier regions 18 of each of the flux barriers 11. Further, $w_B$ indicates the total sum of the widths of all the bridges, and is expressed as $w_B = 2w_O + w_C$ in the example of FIG. 2. Further, $t_{FB}$ indicates a thickness of the barrier region 18, and $\mu_{re}$ indicates a recoil permeability of the permanent magnet 100. Furthermore, to indicates a permeability of an object with which the barrier region 18 excluding the permanent magnet 100 is filled, that is, a permeability of air. In a case where the barrier region 18 is for example filled with a non-magnetic material (e.g., a resin) for fixing the permanent magnet 100, the permeability $\mu_0$ may be a permeability corresponding to a physical property of the non-magnetic material. $B_s$ indicates a saturated magnetic flux density of the rotor core 9 in a width direction (a transverse direction) that is nearly orthogonal to an extending direction of the flux barrier 11, and $B_r$ indicates a residual magnetic flux density of the permanent magnet 100. Among these parameters, $w_O$, $w_O$, $t_{FB}$, and $S_M$ may be defined as follows.

Figure 3:
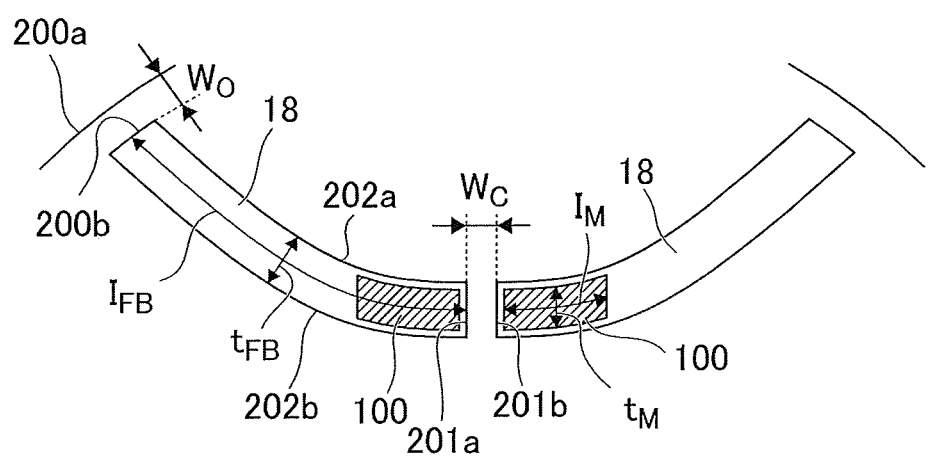
FIG. 3 is a diagram for showing definitions of parameters of Equation (1).

FIG. 3 is a view for showing the definitions of the parameters of Equation (1). In FIG. 3, among the surfaces by which the outline of the barrier region 18 is defined, a surface 200b is a surface located on an outer circumference in the extending direction (the longitudinal direction) of the flux barrier 11, and a surface 201a is a surface close to the central axis O in the extending direction of the flux barrier 11. Further, a surface 202a is a surface located on an outer circumference in a width direction of the flux barrier 11, and a surface 202b is a surface close to the central axis O in the width direction of the flux barrier 11. In the following description, the surface 200b, the surface 201a, the surface 202a, and the surface 202b will be referred to as a tip 200b, a tip 201a, an upper lateral surface 202a, and a lower lateral surface 202b.

The width $w_O$ of the outer circumferential bridge $BD_S$ is set to a distance between the outer circumferential surface 200a of the rotor core 9 and the tip 200b of the barrier region 18. The tip 200b of the barrier region 18 is one of the surfaces by which the outline of the barrier region 18 is defined, and is the surface located on the outer circumference in the extending direction of the flux barrier 11. For example, in a case where curved lines or broken lines that represent the outer circumferential surface 200a of the rotor core 9 and the tip 200b of the barrier region 18 are not parallel to each other, the width $w_O$ of the outer circumferential bridge $BD_S$ is defined as an arithmetic mean value between a minimum distance and a maximum distance between the curved lines or the broken lines. For example, an arbitrary reference point is set on the curved line or the broken line that indicates the outer circumferential surface 200a of the rotor core 9. A straight line showing that a distance from the reference point to the curved line or the broken line indicating the tip 200b that is an interface of the barrier region 18 which is located on the outer circumferential side is shortest is derived. Afterward, a plurality of straight lines showing that they are shortest while shifting the reference point are derived on the curved line or the broken line that indicates the outer circumferential surface 200a. An average of lengths of the plurality of straight lines derived in this way is defined as the width $w_O$ of each outer circumferential bridge $BD_S$. That is, the width $w_O$ of each outer circumferential bridge $BD_S$ becomes the distance between two surfaces facing each other. Similarly, the width $w_C$ of the center bridge $BD_C$ crosses the center bridge $BD_C$, and is taken as the distance between the surfaces 201a and 201b of the paired barrier regions 18 which are close to the center bridge $BD_C$. For example, in a case where curved lines or broken lines that represent the surfaces 201a and 201b of the barrier regions 18 which are close to the center bridge $BD_C$ are not parallel to each other, the width $w_C$ of the center bridge $BD_C$ is defined as an arithmetic mean value between a minimum value and a maximum value of the distance between the curved lines or the broken lines.

Further, the thickness $t_{FB}$ of the barrier region 18 is defined as an arithmetic mean value between a minimum value and a maximum value of the distance between curved lines or broken lines that represent the upper lateral surface 202a of the barrier region 18 (the lateral surface close to the outer circumference), and the lower lateral surface 202b of the barrier region 18 (the lateral surface close to the central axis O). For example, an arbitrary reference point is set on the curved line or the broken line that represents the upper lateral surface 202a of the barrier region 18. The distance from the reference point to the curved line or the broken line indicating the lower lateral surface 202b derives a straight line that indicates a shortest straight line. Afterward, a plurality of straight lines that indicate shortest straight lines are derived on the curved line or the broken line indicating the upper lateral surface 202a while shifting the reference point. An average of lengths of the plurality of straight lines derived in this way is defined as the thickness $t_{FB}$ of the barrier region 18. Further, a width $l_{FB}$ of the barrier region 18 is defined as an arithmetic mean value of lengths of the curved lines or the broken lines that represent the upper and lower lateral surfaces 202a and 202b of the barrier region 18. For example, an arbitrary reference point is set on the curved line or the broken line that represents the upper lateral surface 202a of the barrier region 18. A distance from the reference point to the curved line or the broken line indicating the lower lateral surface 202b derives a straight line that indicates a shortest straight line. Afterward, a plurality of straight lines which indicate that a distance from the lower lateral surface 202b is shortest are derived on the curved line or the broken line indicating the upper lateral surface 202a while shifting the reference point. A length of a curved line that passes through the midpoints of the plurality of straight lines derived in this way is defined as the width $l_{FB}$ of the barrier region 18.

Further, the gross cross-sectional area $S_M$ of the permanent magnets 100 is defined as a product of a cross-sectional area of each of the permanent magnets 100, which is obtained by multiplying a width $l_M$ of the permanent magnet 100 by a thickness $t_M$ of the permanent magnet 100 in each of the flux barriers 11, and the number of permanent magnets 100 (two in the example of FIG. 3). As with the definition of the thickness $t_{FB}$ of the barrier region 18, the thickness $t_M$ of the permanent magnet 100 is defined as an arithmetic mean value between a minimum distance and a maximum distance between curved lines or broken lines that represent an upper lateral surface of the permanent magnet 100 (a surface close to the outer circumference in a width direction of the flux barrier 11), and a lower lateral surface of the permanent magnet 100 (a surface close to the central axis O in the width direction of the flux barrier 11). Further, as with the definition of the width $l_{FB}$ of the barrier region 18, the width $l_M$ of the permanent magnet 100 is defined as an arithmetic mean value of lengths of the curved lines or the broken lines that represent the upper and lower lateral surfaces of the permanent magnet 100.

Figure 4:
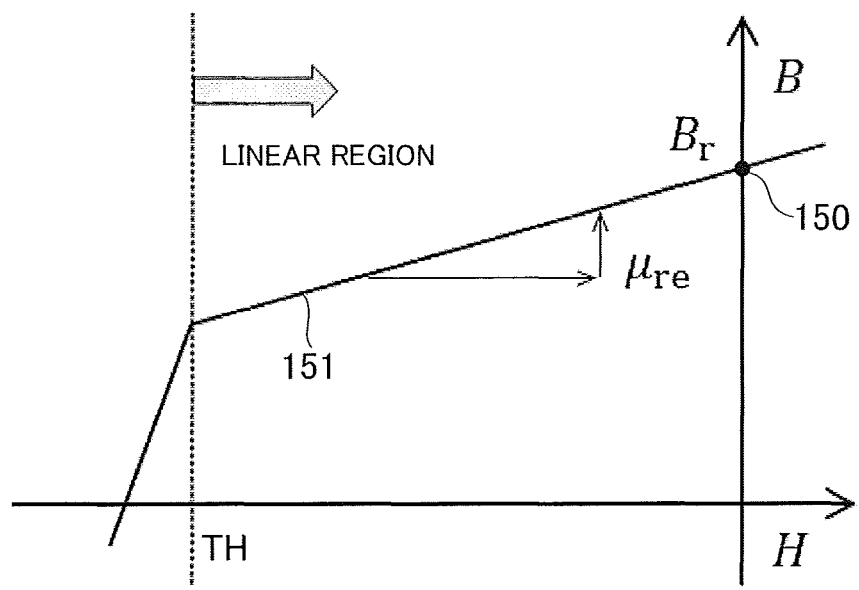
FIG. 4 is a diagram showing an example of magnetic properties of a permanent magnet.

FIG. 4 is a diagram showing an example of magnetic properties of the permanent magnet 100. As showed in FIG. 4, among the above parameters, $\mu_{re}$ and $B_r$ can be expressed as magnetic properties of the permanent magnet 100 as follows. For example, the residual magnetic flux density $B_r$ of the permanent magnet 100 can be derived as a magnetic flux density (a y-intercept 150 of the graph) in a linear region when a magnetic field intensity H is about zero. Further, the recoil permeability $\mu_{re}$ can be derived as a slope of a straight line 151 that represents a change of the magnetic flux density B with respect to the magnetic field intensity H in the linear region.

In a case where constitutions around the flux barrier 11 of the rotor 3 showed in FIG. 3 are replaced with an equivalent magnetic circuit using parameters that determine dimensions of the permanent magnet 100, the barrier region 18, the outer circumferential bridge $BD_S$, and the center bridge $BD_C$ which have all been described above, the equivalent magnetic circuit can be expressed as in FIG. 5 below.

Figure 5:
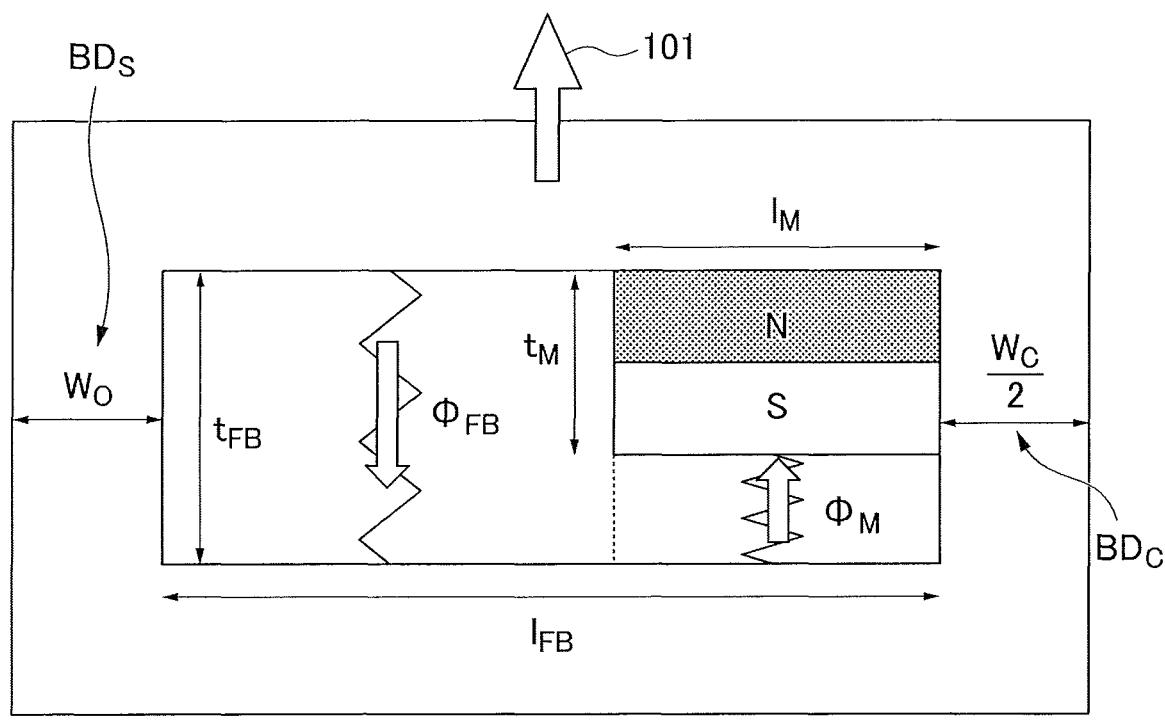
FIG. 5 is a diagram showing an example of a magnetic circuit.

FIG. 5 is a diagram showing an example of a magnetic circuit. For example, a magnetomotive force $E_M$ of the permanent magnet 100 in the magnetic circuit can be treated as $(t_M*B_r)/\mu_{re}$. Further, an internal magnetic resistance $r_M$ of the permanent magnet 100 can be treated as $t_M/(\mu_{re}*I_M)$. The magnetic circuit is operated in a linear region where no irreversible demagnetization occurs. When a circuit equation is set up for magnetic flux $\Phi_M$ that flows through the permanent magnet 100 and magnetic flux $\Phi_{FB}$ that flows through the barrier region 18, a condition that a magnetic flux 101 leaking out from the magnetic circuit showed in FIG. 5 does not occur can be derived as Equation (1) above. If an area (a width $I_M$ and a thickness $t_M$) of the permanent magnet 100 is determined within a range where Equation (1) is satisfied, magnetic flux of each of the bridges can be saturated under constraint condition that no magnetic flux leaks out to the outside. That is, the saliency of the reluctance motor 1 can be improved without generating an induced voltage. The permanent magnet 100 abuts on a right upper lateral surface of the barrier region 18 in FIG. 5, but the condition that no magnetic flux leaks out to the outside is expressed by Equation (1) even in a case where the permanent magnet 100 is arranged in the middle of the barrier region 18 such that lateral surfaces thereof are not in contact with the barrier region 18. Further, a cross section of the permanent magnet is flat in a direction of the width $I_M$ in FIG. 5, but it may be flat in a direction of the thickness $t_M$. That is, if the cross-sectional areas and the residual magnetic flux densities of the permanent magnets are the same regardless of a method of arranging the permanent magnet 100, magnetic properties viewed from the outside become equivalent.

Figure 6:
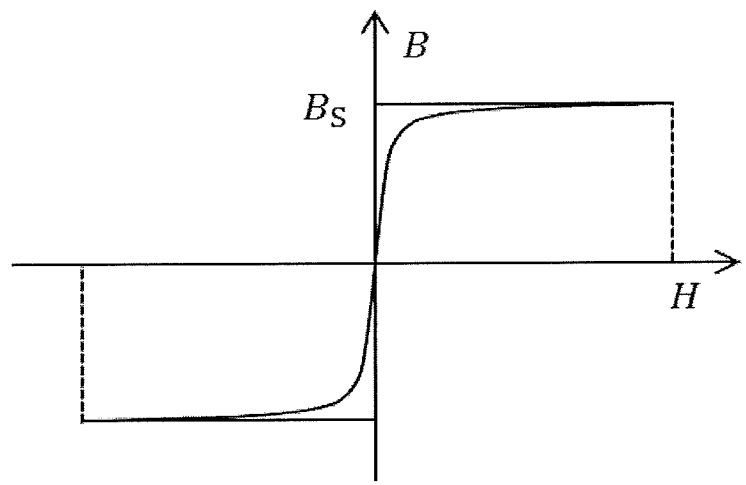
FIG. 6 is a diagram showing an example of a trend in magnetization characteristics of the rotor core.

FIG. 6 is a diagram showing an example of a trend in magnetization characteristics of the rotor core 9. It is generally known that the magnetization characteristics of the rotor core 9 vary gently. As showed in FIG. 6, in a case where magnetic properties vary, the parameter $B_s$ of Equation (1) cannot be uniquely determined. Accordingly, an allowance may be given to the saturated magnetic flux density $B_s$ of the rotor core 9 within a certain numerical range. The numerical range will be described below.

Figure 7:
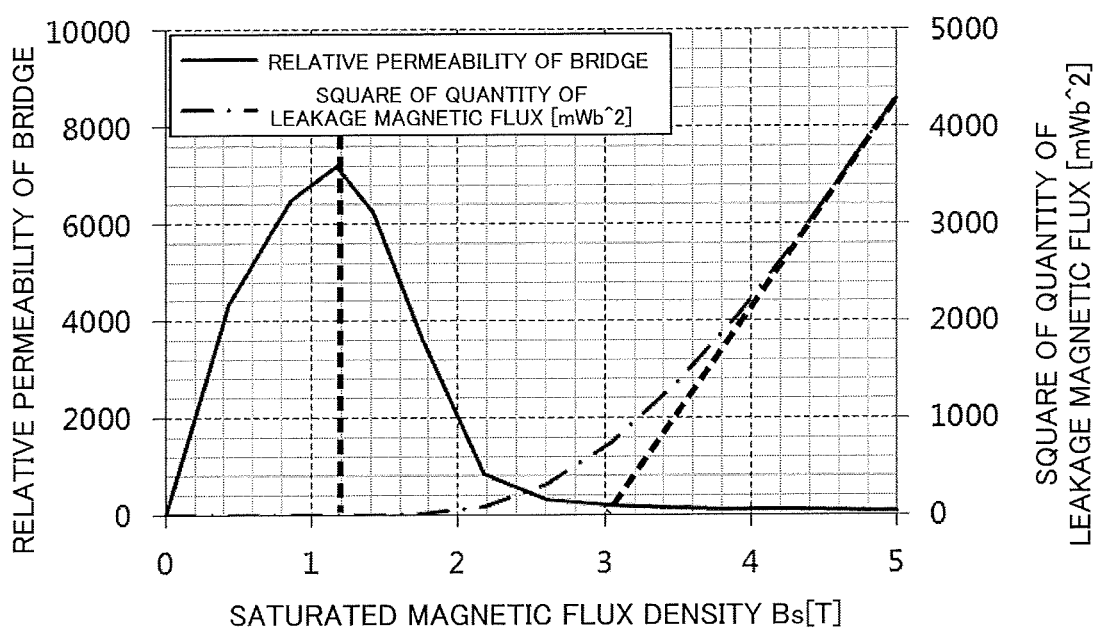
FIG. 7 is a diagram showing an example of the relationship between the saturated magnetic flux density of the rotor core, the relative permeability of each bridge, and the quantity of a leakage magnetic flux.

FIG. 7 is a diagram showing an example of the relationship between a saturated magnetic flux density $B_s$ of the rotor core 9, the relative permeability of each of the bridges, and the quantity of a leakage magnetic flux linked to the armature winding 7. The relative permeability of each of the bridges is a ratio of the permeability of the bridge to the vacuum permeability. The quantity of the leakage magnetic flux is the square value of magnetic flux that flows through a gap G and leaks out to the stator 2. Since a non-load iron loss or a loss at the time of a short-circuit accident is proportional to the square of the quantity of the magnetic flux that leaks out to the stator 2, it is also evaluated by the square value of the quantity of the magnetic flux that leaks out to the stator 2 in the present embodiment. The results showed in FIG. 7 represent analysis results (simulation results) assuming a model in which, in the cross section equivalent to one pole for the rotating shaft 8 of the reluctance motor 1, the rotor core 9 is formed of a silicon steel sheet (a nonlinear magnetization characteristic), the flux barriers 11 are set to three layers, the barrier regions 18 are set to two in each of the flux barriers 11, the center bridge $BD_C$ is set to three in each of the flux barriers 11, and neodyminum magnets are inserted into the barrier regions 18 sandwiched between the two center bridges $BD_C$. This model is equivalent to a model that assumes a reluctance motor 1C showed in FIG. 13 to be described below. The saturated magnetic flux density $B_s$ in the figure is a value that is analytically derived using Equation (2) below. Parameters in Equation (2) are the same as those used in Equation (1) above.

[Equation 2]

$$B_s = \frac{\mu_0 S_M}{\mu_{re} t_{FB} w_B} B_r \qquad (2)$$

In the showed example, the relative permeability of each of the bridges has a tendency to increase in a range where the saturated magnetic flux density $B_s$ of the rotor core 9 ranges from 0 to 1.2 T (teslas). That is, each of the bridges is brought into a state in which magnetic flux flows easily. Further, the relative permeability of each of the bridges has a tendency to decrease in a range where the saturated magnetic flux density $B_s$ is equal to or higher than 1.2 T. That is, each of the bridges is brought into a state in which magnetic flux flows hardly. Accordingly, in a case where attention is paid only to the relative permeability of each of the bridges, a cross-sectional area and a residual magnetic flux density of the permanent magnet 100 are preferably determined such that the saturated magnetic flux density $B_s$ is equal to or higher than 1.2 T that is a maximum value of the relative permeability of each of the bridges.

On the other hand, in a case where attention is paid to the quantity of the leakage magnetic flux, the quantity of magnetic flux (the square value of magnetic flux) leaking out to the stator 2 can be kept to about zero in a range where the saturated magnetic flux density $B_s$ of the rotor core 9 amounts to about 2 T. That is, the occurrence of an induced voltage can be inhibited in the range where the saturated magnetic flux density $B_s$ of the rotor core 9 amounts to about 2 T. Since the quantity of magnetic flux leaking out to the stator 2 increases exponentially in a range where the saturated magnetic flux density $B_s$ of the rotor core 9 is equal to or higher than 2 T, an induced voltage occurs easily. Here, an influence of the leakage magnetic flux can be disregarded if the quantity of the leakage magnetic flux is equal to or lower than about 1000 mWb$^2$, and an upper limit of the saturated magnetic flux density $B_s$ of the rotor core 9 is preferably set within this range. To be specific, an intersection of an asymptotic line of a curved line that represents the square variation in the quantity of magnetic flux leaking out to the stator 2 is set to the upper limit of the saturated magnetic flux density $B_s$ of the rotor core 9. In the present embodiment, the upper limit is set to 3.0 T as showed.

As a comparative example of the permanent magnets 100 in the present embodiment, in a case where permanent magnets used in a permanent magnet synchronous motor (PMSM) or the like are inserted into barrier regions 18, a saturated magnetic flux density $B_s$ of each bridge (a rotor core 9) is about 5 T. On the other hand, in the present embodiment, since the size of the permanent magnet 100 is determined such that the saturated magnetic flux density $B_s$ of each bridge falls within a range between 1.2 T and 3.0 T, the quantity of a leakage magnetic flux can be reduced to about one fourth compared to the permanent magnet synchronous motor as the comparative example. That is, the permanent magnets 100 that are not to interfere with driving of the reluctance motor 1 are inserted into the barrier regions 18, so that the magnetic flux of each bridge can become saturated.

According to the first embodiment described above, since the cross-sectional area and the residual magnetic flux density of the permanent magnet 100 are determined such that the saturated magnetic flux density $B_s$ of each bridge is equal to or higher than 1.2 T, each bridge can be magnetically invalidated by saturation. Thus, the saliency of the reluctance motor 1 can be improved without generating an induced voltage, and a salient pole ratio can be increased. As a result, performance (torque, efficiency, a power factor, etc.) of the motor can be improved, and energy efficiency can be improved.

Further, according to the first embodiment described above, since the cross-sectional area and the residual magnetic flux density of the permanent magnet 100 are determined such that the saturated magnetic flux density $B_s$ of each bridge is equal to or lower than 3 T, the magnetic flux 101 generated from the permanent magnet 100 to be linked to the armature winding 7 is extremely small so that the occurrence of an induced voltage can be inhibited, and there is no need to separately provide a protective circuit or the like for an accidental short-circuit or the like. Further, since a non-load iron loss does not occur, energy efficiency as a system using the present motor can be improved.

The above description has been made regarding an electric motor (motor). However, the present rotary machine may also be operated as a power generator (a generator), and this falls within a range of application of the present embodiment.

Modification of the First Embodiment

Hereinafter, a modification of the first embodiment will be described. According to equations (1) and (2) above, if the gross cross-sectional area $S_M$ of the permanent magnets 100 in the cross section including the d and q axes is constant, each of the bridges can be saturated without depending on the disposition positions of the permanent magnets 100 in the barrier regions 18. Accordingly, in the modification of the first embodiment, for example, the permanent magnets 100 are lopsidedly arranged close to the outer circumferential bridges $BD_S$.

Figure 8:
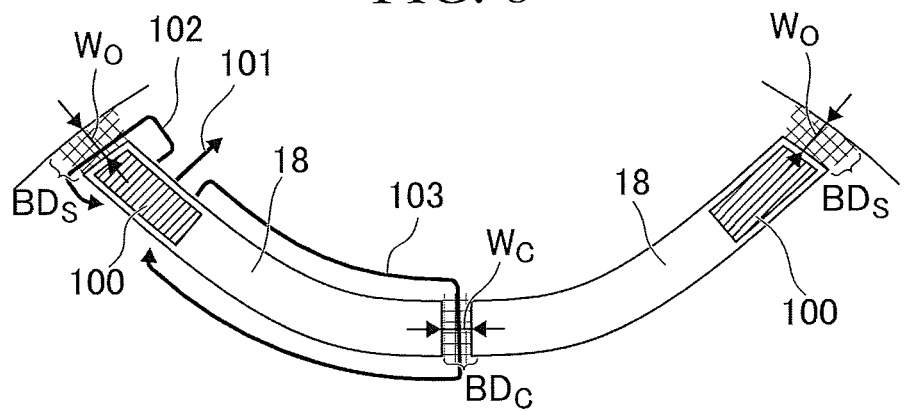
FIG. 8 is a diagram showing an example of disposition positions of the permanent magnets in barrier regions.

FIG. 8 is a diagram showing an example of the disposition positions of the permanent magnets 100 in the barrier regions 18. In general, a magnetic path width of a core region excluding the bridges is sufficiently wider than a bridge width, and even if the bridges are saturated, the core region other than them is not saturated. Therefore, even if the permanent magnets 100 are inserted, a relative permeability of the core region other than the bridges is extremely as large as about several thousands, and becomes a negligible resistance value when considered as a magnetic circuit. Therefore, as showed, even in a case where the permanent magnets 100 are arranged at positions closer to the outer circumferential bridges $BD_S$ than to the center bridge $BD_C$, nearly the same magnetomotive force is applied to the center bridge $BD_C$ and the outer circumferential bridges $BD_S$, and saturation levels also become equivalent to each other. That is, no matter where the permanent magnets 100 are arranged in the barrier regions 18, the cores of the bridges can be saturated.

Figure 9:
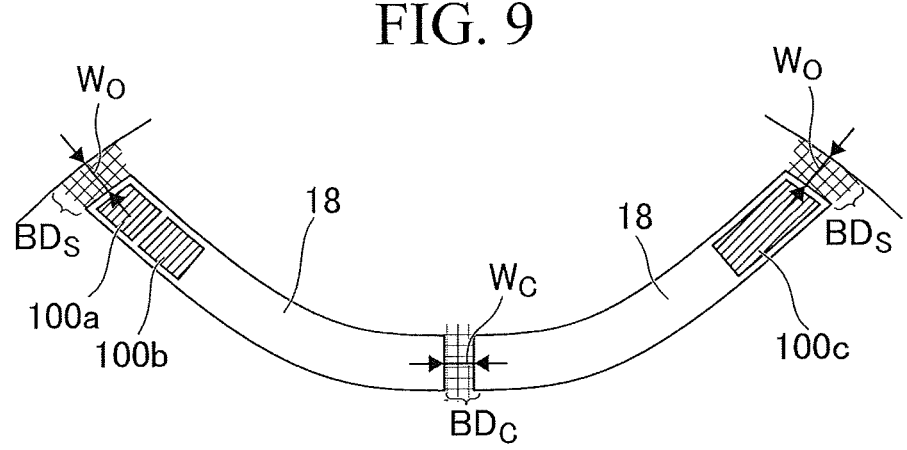
FIG. 9 is a diagram showing another example of the disposition positions of the permanent magnets in the barrier regions.

Further, the number of permanent magnets 100 inserted into a single barrier region 18 is not limited to one, and may be two or more. FIG. 9 is a diagram showing another example of the disposition positions of the permanent magnets 100 in the barrier regions 18. As showed, for example, two permanent magnets 100 may be inserted into any one of the paired barrier regions 18 between which the center bridge $BD_C$ is sandwiched such that the number of permanent magnets 100 is asymmetrical. In this case, cross-sectional areas of the permanent magnets 100 in both the paired barrier regions 18 may be different if they are within the above numerical range.

Figure 10A:
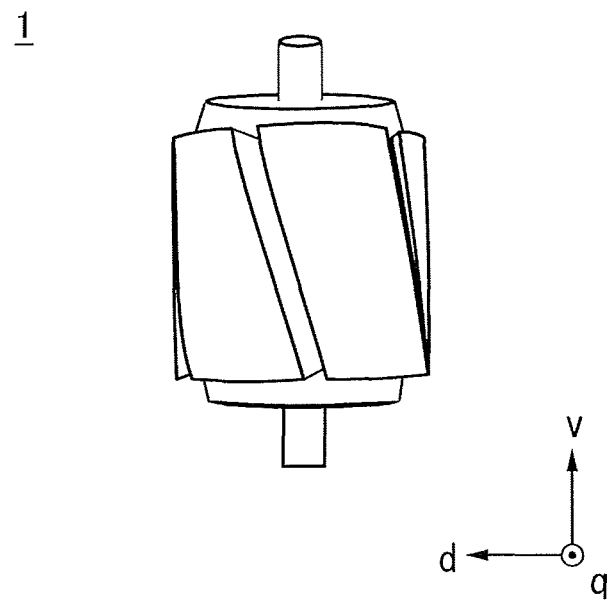
FIG. 10A is a diagram showing an example of an appearance of the reluctance motor.
Figure 10B:
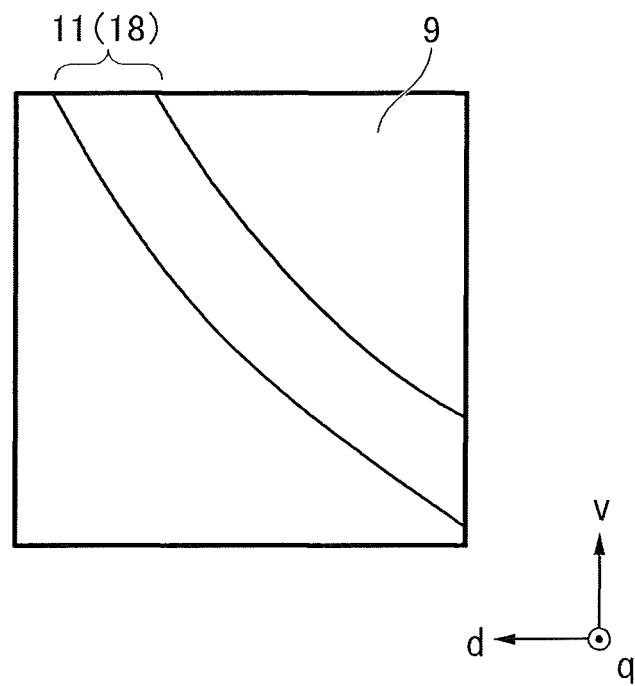
FIG. 10B is a diagram showing an example of an appearance of the reluctance motor.

Further, the reluctance motor 1 may have a skew structure. FIGS. 10A and 10B are a diagram showing an example of an appearance of the reluctance motor 1. As showed in FIG. 10A, in a case where the reluctance motor 1 has a skew structure, the flux barriers 11 may, as showed in FIG. 10B, have different positions in the cross section defined by the d and q axes according to a position of a v axis (i.e., the rotating shaft 8) that is orthogonal to the cross section defined by the d and q axes. In this case, a shape of the permanent magnet 100 may also be a shape corresponding to the skew structure.

Further, in the first embodiment, the permanent magnet 100 has been described as being inserted into each of the barrier regions 18 of each flux barrier 11, but the present invention is not limited thereto. The flux barriers 11 in which the permanent magnet 100 is not inserted into any of the barrier regions 18 may be formed. That is, the magnetic flux of the bridges are saturated by the permanent magnets 100, and thereby the flux barrier 11 that further reduces leakage magnetic flux in the direction of the d axis and the flux barrier 11 that simply reduces leakage magnetic flux in the direction of the d axis by means of the barrier regions 18 may be combined.

Further, it has been described that there are four salient poles of the reluctance motor 1, but the present invention is not limited thereto. The number of salient poles may be two poles, six poles, eight poles, or an arbitrary number of poles other than this.

Second Embodiment

Hereinafter, a reluctance motor 1A in a second embodiment will be described. Here, to differentiate the second embodiment from the first embodiment, the case where that the permanent magnet 100 is inserted into only any one of the paired barrier regions 18 between which the center bridge $BD_C$ is sandwiched will be described. Hereinafter, functions or the like that are the same as in the aforementioned first embodiment will not be described.

Figure 11:
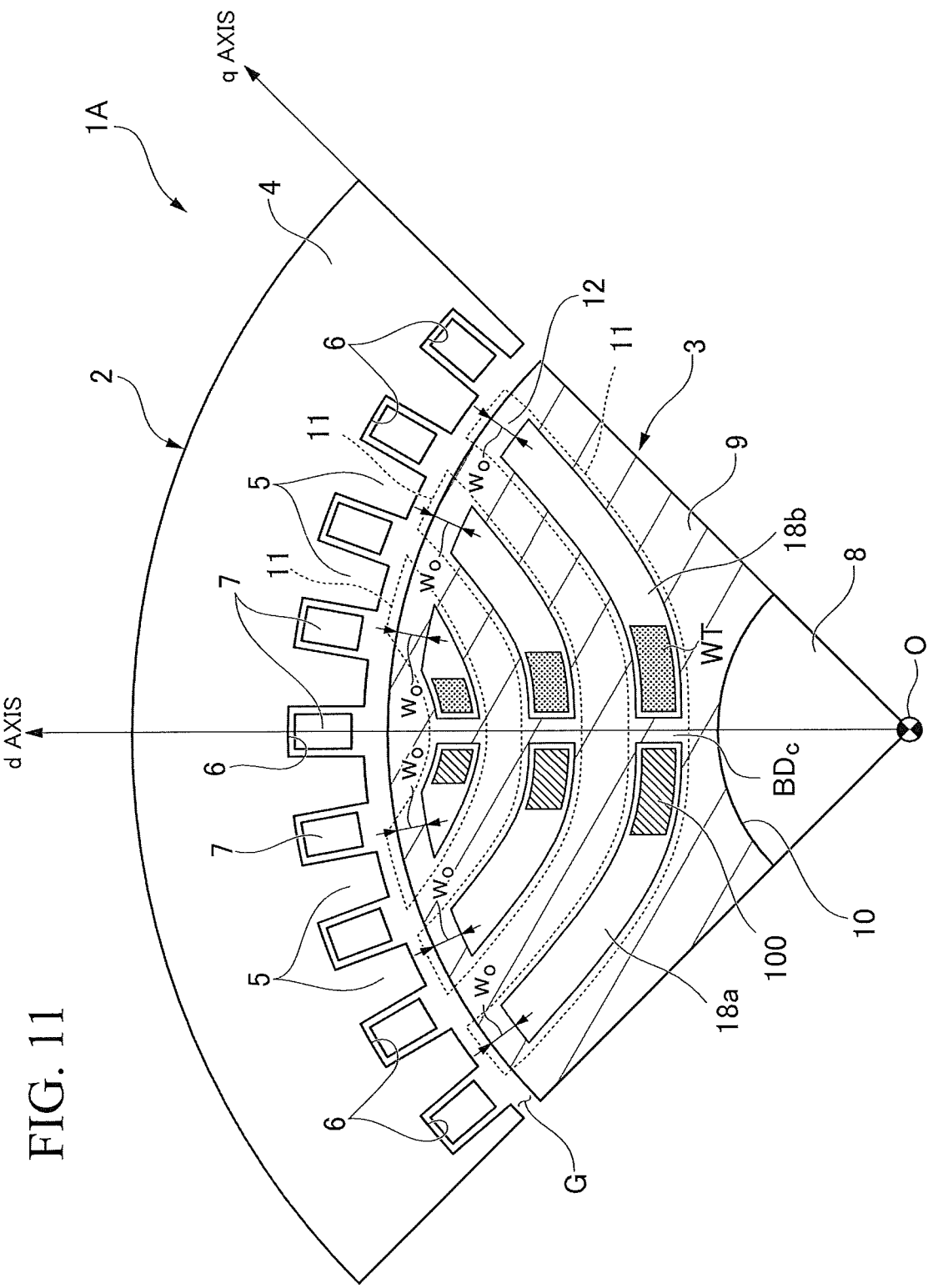
FIG. 11 is a sectional view that shows a constitution equivalent to one pole of a reluctance motor in a second embodiment and that is orthogonal to a rotating shaft.

FIG. 11 is a sectional view that shows a constitution equivalent to one pole of a reluctance motor 1A in a second embodiment and that is orthogonal to a rotating shaft 8. In the second embodiment, a permanent magnet 100 is inserted into only any one of paired barrier regions 18 between which a center bridge $BD_C$ is sandwiched, and a weight-adjusting member WT having nearly the same weight as the permanent magnet 100 is inserted into the other barrier region 18. That is, the permanent magnet 100 is provided in one of the barrier regions 18 which is close to either side with respect to the middle of each flux barrier 11 (e.g., a position at which distances from ends of each flux barrier 11 are the same in a longitudinal direction of each flux barrier 11), and the weight-adjusting member WT is provided in the other barrier region 18 that is not close to this side. The weight-adjusting member WT is a non-magnetic material. The barrier region 18 into which the weight-adjusting member WT is inserted may be filled with a non-magnetic material such as an adhesive resin in order to fix the weight-adjusting member WT, and a spacer or the like of the non-magnetic material may be inserted into the barrier region 18 along with the weight-adjusting member WT.

In FIG. 11, a reference sign 18 that indicates the barrier region, a reference sign 100 that indicates the permanent magnet, and a reference sign WT that indicates the weight-adjusting member are given for only the flux barrier 11 closest to a central axis O, which applies equally to the other flux barriers 11. Further, separated barrier regions are indicated as 18a and 18b.

In a case where the weight-adjusting member WT is inserted into the barrier region 18, a cross-sectional area of the weight-adjusting member WT is not included in the gross cross-sectional area $S_M$ of the permanent magnets 100 in Equation (1) or (2) above. That is, a saturated magnetic flux density $B_s$ of a rotor core 9 needs to be evaluated using only the cross-sectional area of the permanent magnet 100 inserted into one of the barrier regions 18.

Further, in the example of FIG. 11, the weight-adjusting member WT is inserted into only the right side of a d axis, but the present invention is not limited thereto. The disposition of the weight-adjusting member WT may be exchanged in each of the flux barriers 11.

Hereafter, the relationship between the saturated magnetic flux density $B_s$ of the rotor core 9, the relative permeability of each bridge, and the quantity of leakage magnetic flux linked to an armature winding 7 in the reluctance motor 1A of the second embodiment will be described.

Figure 12:
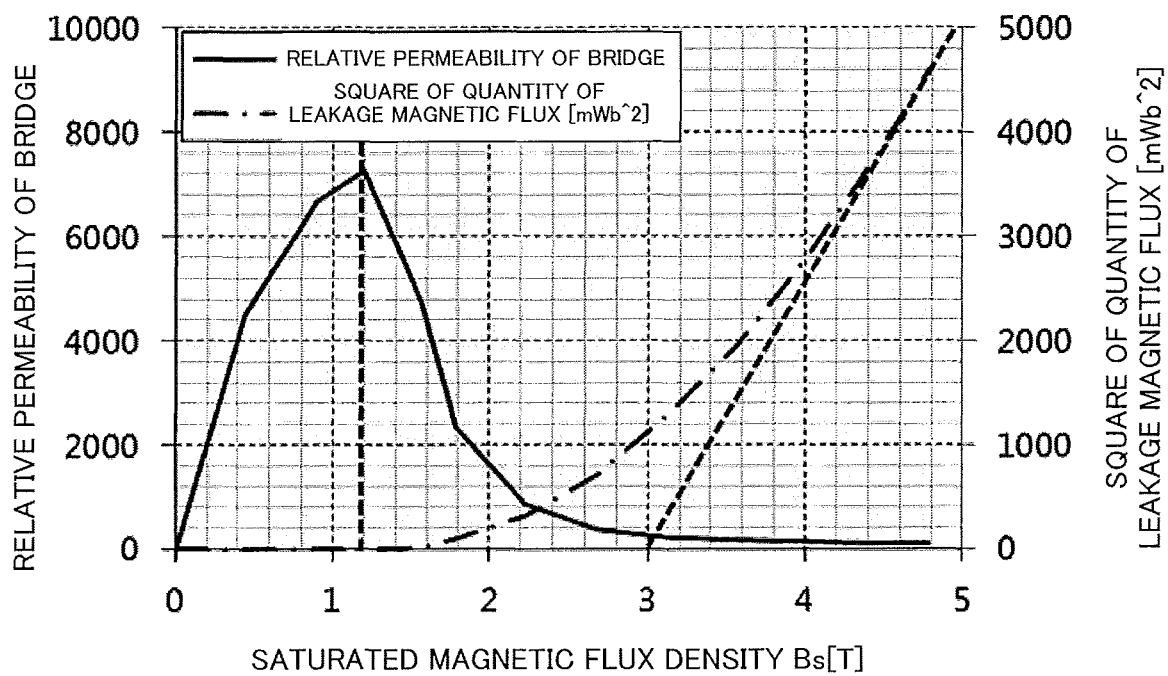
FIG. 12 is a diagram showing another example of the relationship between the saturated magnetic flux density of the rotor core, the relative permeability of each bridge, and the quantity of a leakage magnetic flux linked to an armature winding.

FIG. 12 is a diagram showing another example of the relationship between the saturated magnetic flux density $B_s$ of the rotor core 9, the relative permeability of each bridge, and the quantity of the leakage magnetic flux linked to the armature winding 7. The relative permeability of each bridge is a ratio of the permeability of the bridge to the vacuum permeability. As with the first embodiment, in the second embodiment, the relative permeability is also evaluated by the square value of the quantity of magnetic flux that leaks out to a stator 2.

The results showed in FIG. 12 are analysis results assuming a model of the constitution of the reluctance motor 1A showed in FIG. 11. In the model used for this analysis, for example, in a cross section equivalent to one pole for a rotating shaft 8 of the reluctance motor 1A, the rotor core 9 is formed of a silicon steel sheet (a nonlinear magnetization characteristic), the flux barriers 11 are set to three layers, the barrier regions 18 are set to two in each of the flux barriers 11, and the center bridge $BD_C$ included in each of the flux barriers 11 is set to one. Further, in the model used for the analysis, permanent magnets 100 having nearly the same cross-sectional area and residual magnetic flux density $B_r$, are inserted into both of the two barrier regions 18. The saturated magnetic flux density $B_s$ in the figure is a value that is analytically derived by Equation (2) above.

As with the results showed in FIG. 7, the results showed in FIG. 12 show that, in a case where attention is paid to the relative permeability of each bridge, the relative permeability of each bridge has a tendency to increase in a range where the saturated magnetic flux density $B_s$ of the rotor core 9 ranges from 0 to 1.2 T (teslas). Further, the relative permeability of each bridge has a tendency to decrease in a range where the saturated magnetic flux density $B_s$ is equal to or higher than 1.2 T. On the other hand, in a case where attention is paid to the quantity of the leakage magnetic flux, the quantity of magnetic flux (the square value of magnetic flux) leaking out to the stator 2 is about zero in a range where the saturated magnetic flux density $B_s$ of the rotor core 9 amounts to about 2 T, whereas the quantity of magnetic flux leaking out to the stator 2 increases exponentially in a range where the saturated magnetic flux density $B_s$ of the rotor core 9 is equal to or higher than 2 T. Accordingly, even in a case where the number of center bridges $BD_C$ is two, the cross-sectional area of the permanent magnet 100 is determined such that the saturated magnetic flux density $B_s$ of each bridge falls within a range between 1.2 T and 3.0 T, and thereby the magnetic flux of each bridge can be saturated while inhibiting an increase in the quantity of the leakage magnetic flux. In this way, even in a case where a change in design of changing the number or positions of the bridges is performed, the results derived using the theoretical equatione of Equatione (1) and (2) show a similar tendency, and the same effect can be obtained if the cross-sectional area of the permanent magnet 100 is determined such that the saturated magnetic flux density $B_s$ of each bridge falls within the numerical range.

According to the second embodiment described above, as with the aforementioned first embodiment, since the permanent magnets 100 are provided in the barrier regions 18 such that the induced voltage of the reluctance motor 1 does not occur, saliency can be improved compared to a reluctance motor 1 in which no permanent magnets 100 are provided in barrier regions 18. As a result, energy efficiency can be improved.

According to the second embodiment described above, since the weight-adjusting members WT are inserted instead of the permanent magnets 100, mechanical imbalance in the rotor 3 can be eliminated, and stress occurring at the rotor core 9 between the flux barriers 11 (also including each bridge) can be dispersed in a balanced way. As a result, the mechanical strength of the rotor 3 can be improved.

Third Embodiment

Hereinafter, a reluctance motor 1B in a third embodiment will be described. Here, to differentiate the third embodiment from the first and second embodiments, the case where either the center bridge $BD_C$ or the outer circumferential bridges $BD_S$ is not present will be described. Hereinafter, functions or the as with that are the same as in the aforementioned first and second embodiments will not be described.

Figure 13:
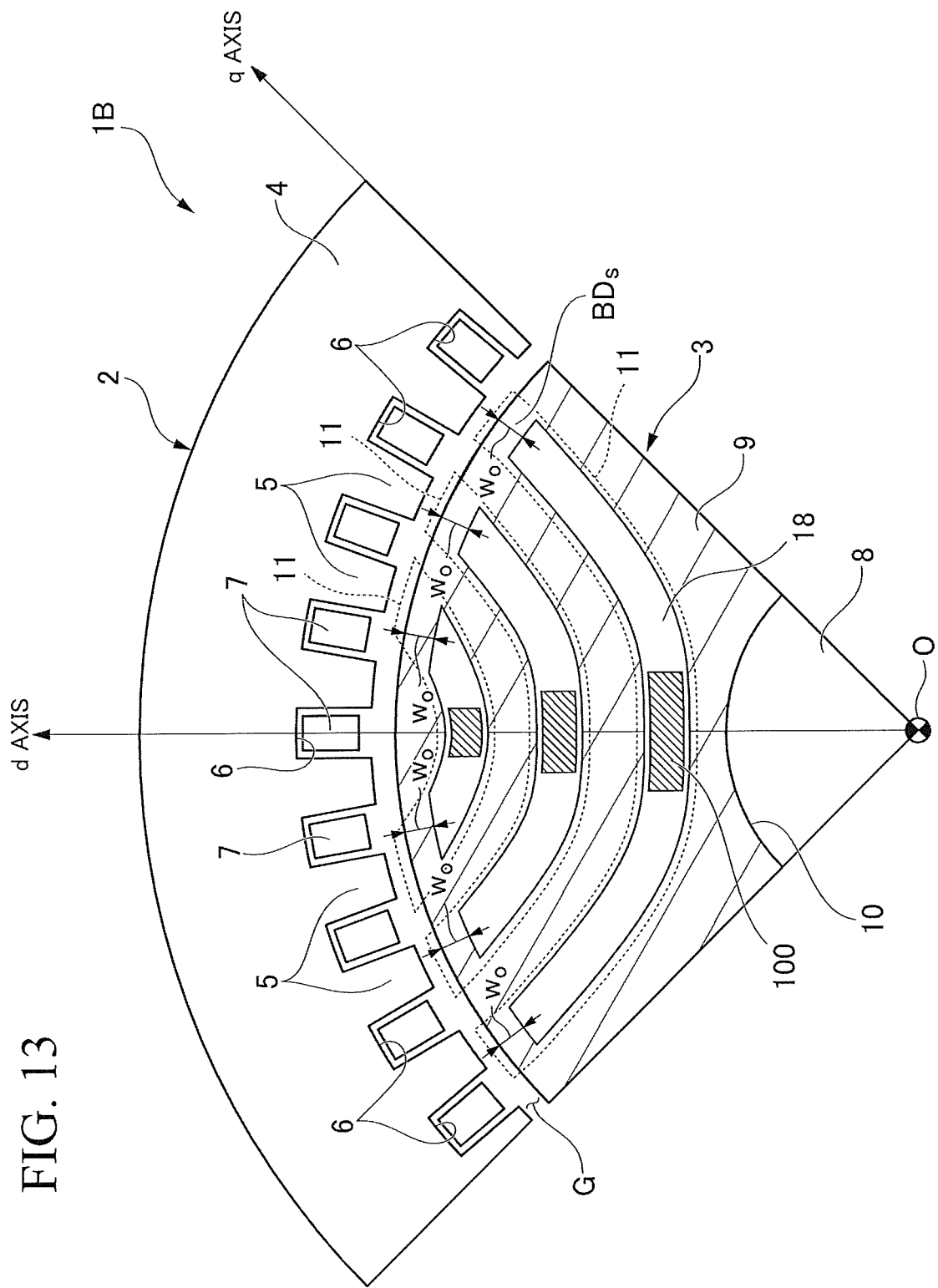
FIG. 13 is a sectional view that shows a constitution equivalent to one pole of a reluctance motor in a third embodiment and that is orthogonal to a rotating shaft.

FIG. 13 is a sectional view that shows a constitution equivalent to one pole of a reluctance motor 1B in a third embodiment and that is orthogonal to a rotating shaft 8. In the third embodiment, only outer circumferential bridges $BD_S$ are present, and each flux barrier 11 has one barrier region 18. In this case, in Equation (1) above, $w_B$ is treated as $2w_O$, and thereby the size of the permanent magnet 100 may be determined. In FIG. 13, a reference sign 18 that indicates the barrier region, and a reference sign 100 that indicates the permanent magnet are given for only the flux barrier 11 closest to a central axis O, which applies equally to the other flux barriers 11. Further, separated barrier regions are indicated as 18a and 18b.

Further, only the center bridge $BD_C$ may be present in the reluctance motor 1B showed in FIG. 13. In this case, in Equation (1) above, $w_B$ is treated as $w_C$, and thereby the size of the permanent magnet 100 may be determined.

According to the third embodiment described above, as with the first and second embodiments, since the permanent magnets 100 are provided in the barrier regions 18 such that the induced voltage of the reluctance motor 1 does not occur, saliency can be improved compared to a reluctance motor 1 in which no permanent magnets 100 are provided in barrier regions 18. As a result, energy efficiency can be improved.

Further, according to the third embodiment described above, since the number of bridges can be reduced, the permanent magnets 100 provided in the barrier region 18 can be made small.

Fourth Embodiment

Hereinafter, a reluctance motor 1C in a fourth embodiment will be described. Here, to differentiate the third embodiment from the first to third embodiments, the case where three or more barrier regions 18 are formed will be described. Hereinafter, functions or the as with that are the same as in the aforementioned first to third embodiments will not be described.

Figure 14:
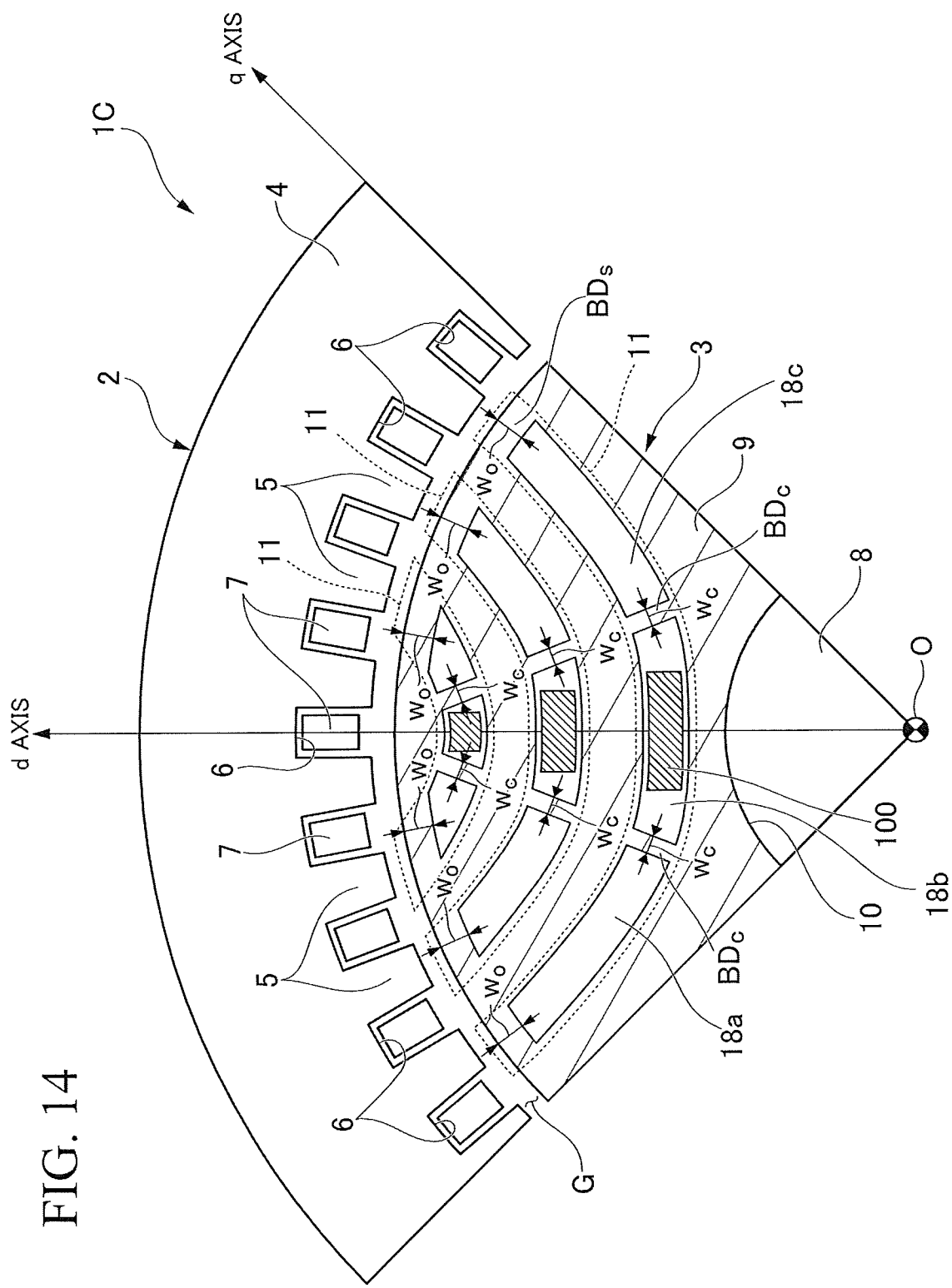
FIG. 14 is a sectional view that shows a constitution equivalent to one pole of a reluctance motor in a fourth embodiment and that is orthogonal to a rotating shaft.

FIG. 14 is a sectional view that shows a constitution equivalent to one pole of a reluctance motor 1C in a fourth embodiment and that is orthogonal to a rotating shaft 8. In FIG. 14, a reference sign 18 that indicates a barrier region, and a reference sign 100 that indicates a permanent magnet are given for only the flux barrier 11 closest to a central axis O, which applies equally to the other flux barriers 11. Further, separated barrier regions are indicated as 18a, 18b and 18c. In the fourth embodiment, since three barrier regions 18 are formed at each flux barrier 11, two center bridges $BD_C$ are formed at a halfway point between opposite ends of each flux bather 11. The permanent magnet 100 is mounted in the bather region 18b that is centrally located among the barrier regions 18 (is closest to the central axis O).

Figure 15:
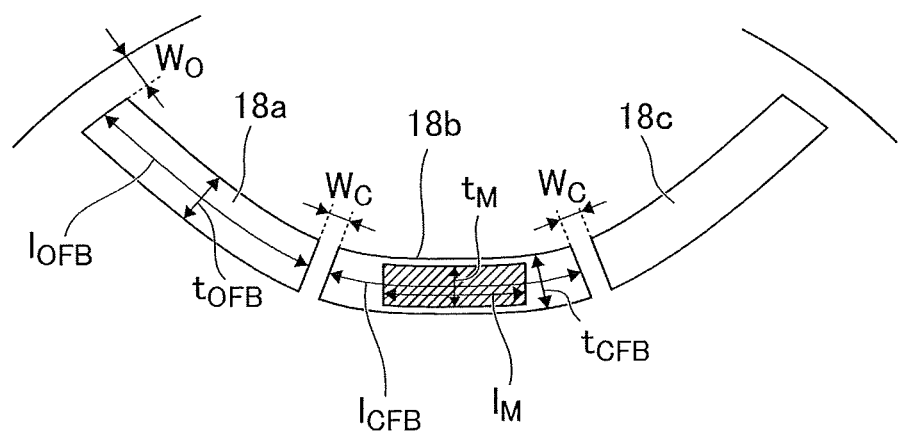
FIG. 15 is a diagram showing another example of the disposition positions of the permanent magnets in the barrier regions.

FIG. 15 is a diagram showing another example of a disposition position of the permanent magnet 100 in the bather regions 18. The permanent magnet 100 is inserted into the barrier region 18 having the shortest distance from the rotating shaft 8 among the plurality of barrier regions 18 in each flux barrier 11. In the showed example, the barrier region 18 having the shortest distance from the rotating shaft 8 is the barrier region 18b. Instead of being inserted into the barrier region 18b sandwiched between the two center bridges $BD_C$, the permanent magnet 100 may be inserted into each of the barrier regions 18a and 18c located on opposite sides of the barrier region 18b. Thus, magnetic flux of the permanent magnet 100 readily flows nearly uniformly to the two outer circumferential bridges $BD_S$ and the two center bridges $BD_C$. Further, since the permanent magnet 100 is inserted into the central barrier region 18b among the three barrier region 18 or each of the barrier regions 18a and 18c located on the opposite sides of the barrier region 18b, mechanical imbalance in the rotor 3 can be eliminated, and stress occurring at the rotor core 9 between the flux barriers 11 (also including each bridge) can be dispersed in a balanced way.

In the fourth embodiment, a thickness $t_{FB}$ of the barrier region 18 of each of the flux barriers 11 is treated as an average of thicknesses of all the barrier regions 18. For example, in a case where a width and a thickness of each of the barrier regions 18a and 18c are defined as $l_{OFB}$ and $t_{OFB}$, and a width and a thickness of the barrier region 18b are defined as $l_{CFB}$ and $t_{CFB}$, the thickness $t_{FB}$ of the barrier region 18 can be expressed as $t_{FB}=(2t_{ORB}+t_{CFB})/3$. Further, a gross cross-sectional area $S_M$ of the permanent magnets 100 is a product of $l_M$ and $t_M$ because the number of permanent magnets 100 is one. Further, the sum $w_B$ of the widths of all the bridges is expressed as $w_B=2(w_O+w_C)$. When these parameters are used, a cross-sectional area and residual magnetic flux density of the permanent magnet 100 can thereby be determined such that leakage magnetic flux that flows through a gap G and is linked to an armature winding 7 is reduced (i.e., an induced voltage is reduced).

According to the fourth embodiment described above, as with the aforementioned first to third embodiments, since the permanent magnets 100 are provided in the barrier regions 18 such that the induced voltage of the reluctance motor 1 does not occur, saliency can be improved compared to a reluctance motor 1 in which no permanent magnets 100 are provided in barrier regions 18. As a result, energy efficiency can be improved.

According to at least one embodiment described above, since the cross-sectional area and residual magnetic flux density of the permanent magnet 100 are determined such that the saturated magnetic flux density $B_s$ of each bridge falls within a range between 1.2 T and 3.0 T, each bridge can be magnetically invalidated while minimizing the induced voltage. Thus, the saliency of the reluctance motor 1 can be improved, and the salient pole ratio can be increased. As a result, performance (torque, efficiency, a power factor, etc.) of the motor can be improved, and energy efficiency can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A rotor, comprising:
a shaft configured to rotate about a central axis; and
a rotor core fixed to the shaft,
wherein the rotor core has a plurality of flux barriers formed side by side in a radial direction of the rotor core, each of the flux barriers ranging from a certain portion to another portion of an outer circumferential surface of the rotor core,
each of the flux barriers has:
a plurality of bridges that include a bridge forming a part of the outer circumferential surface of the rotor core at opposite ends thereof in a longitudinal direction thereof; and
one or more barrier regions that have a lower permeability than a portion other than each of the flux barriers in the rotor core between the plurality of bridges,
a permanent magnet is provided in at least one of the barrier regions,
a magnetizing direction of the permanent magnet is directed in a direction that intersects a longitudinal direction of each of the flux barriers at a position at which the permanent magnet is provided, and
when a permeability of a region where the permanent magnet is not present in the barrier region is defined as $\mu_0$, a cross-sectional area of the permanent magnet in a plane that is orthogonal to an extending direction of the shaft is defined as $S_M$, a residual magnetic flux density of the permanent magnet is defined as $B_r$, a recoil permeability of the permanent magnet is defined as $\mu_{re}$, an arithmetic mean between a minimum and a maximum of a thickness of the bather region is defined as $t_{FB}$, and a sum of widths of all the plurality of bridges is defined as $w_B$, a value of $(\mu_0 \times S_M \times B_r)/(\mu_{re} \times t_{FB} \times w_B)$ is within a range between 1.2 and 3.0.

2. The rotor according to claim 1, wherein the rotor core is formed with one or more magnetic paths which are separated by a flux barrier of the plurality of flux barriers and through which magnetic flux produced by a stator passes.

3. The rotor according to claim 1, wherein the permanent magnet is provided in a barrier region of the one or more barrier regions that is formed at a position close to any one of opposite ends of at least one of the flux barriers in the longitudinal direction thereof, and a weight-adjusting member having nearly the same weight as the permanent magnet is provided in a barrier region of the one or more barrier regions that is formed at a position close to the other end.

4. The rotor according to claim 1, wherein a non-magnetic material is filled between the rotor core and the permanent magnet in the barrier region.

5. The rotor according to claim 1, wherein a plurality of barrier regions including the barrier region are formed in at least one of the flux barriers, and the permanent magnet is provided in a barrier region of the one or more barrier regions that is closest to the shaft among the plurality of barrier regions.

6. A reluctance motor, comprising:
the rotor defined in claim 1;
a stator core disposed on an outer circumference of the rotor core with a space from the rotor core and having a plurality of teeth arranged with a space between each other in a circumferential direction; and
a multipole multiphase armature winding wound around the plurality of teeth.

* * * * *